United States Patent
Avellan et al.

(10) Patent No.: US 7,522,877 B1
(45) Date of Patent: Apr. 21, 2009

(54) NOISE REDUCTION SYSTEM AND METHOD THEREOF

(75) Inventors: Abel Avellan, Miami, FL (US); Sergio Godoy, Chicago, IL (US); Sriram Jayasimha, Somajiguda (IN); Jyothendar Paladugula, Miyapur X Roads (IN)

(73) Assignee: EMC SatCom Technologies, Inc., Miami, FL (US)

( * ) Notice: Subject to any disclaimer, the term of this patent is extended or adjusted under 35 U.S.C. 154(b) by 0 days.

(21) Appl. No.: 12/185,030

(22) Filed: Aug. 1, 2008

(51) Int. Cl.
*H04B 7/185* (2006.01)
(52) U.S. Cl. .................. 455/12.1; 455/22; 455/427
(58) Field of Classification Search ............... 455/63.1, 455/67.11, 67.13, 139, 278.1, 276.1, 283, 455/284, 285; 330/149; 375/296, 297
See application file for complete search history.

(56) References Cited

U.S. PATENT DOCUMENTS

| | | | |
|---|---|---|---|
| 3,894,200 A | | 7/1975 | Campanella et al. |
| 4,092,491 A | * | 5/1978 | Frazer ..................... 375/283 |
| 5,136,577 A | | 8/1992 | Amano et al. |
| 5,157,653 A | | 10/1992 | Genter |
| 5,289,539 A | * | 2/1994 | Maruyama ............ 379/406.09 |
| 5,305,309 A | | 4/1994 | Chujo et al. |
| 5,475,731 A | | 12/1995 | Rasmusson |
| 5,596,439 A | | 1/1997 | Dankberg et al. |
| 5,745,839 A | | 4/1998 | Lieberman |
| 5,818,945 A | | 10/1998 | Makino et al. |
| 6,002,950 A | | 12/1999 | Muraoka |
| 6,011,952 A | | 1/2000 | Dankberg et al. |
| 6,385,237 B1 | | 5/2002 | Tsui et al. |
| 6,725,017 B2 | | 4/2004 | Blount et al. |
| 6,735,264 B2 | | 5/2004 | Miller |
| 6,768,900 B2 | | 7/2004 | Dent et al. |
| 6,859,641 B2 | | 2/2005 | Collins et al. |
| 6,947,741 B2 | * | 9/2005 | Beech et al. .............. 455/430 |
| 7,016,644 B2 | | 3/2006 | Sun |
| 7,228,104 B2 | * | 6/2007 | Collins et al. ............. 455/63.1 |
| 7,236,586 B2 | | 6/2007 | Marchok et al. |
| 7,437,123 B2 | * | 10/2008 | Karabinis et al. ......... 455/12.1 |
| 2003/0202615 A1 | * | 10/2003 | Bach et al. ................ 375/296 |
| 2003/0214339 A1 | * | 11/2003 | Miyamoto ................ 327/276 |
| 2004/0037560 A1 | * | 2/2004 | Mells ........................ 398/76 |
| 2004/0161101 A1 | * | 8/2004 | Yiu et al. ............... 379/406.01 |
| 2005/0243903 A1 | * | 11/2005 | Agazzi ..................... 375/219 |
| 2006/0114814 A1 | * | 6/2006 | Kasami et al. ............ 370/208 |
| 2006/0280234 A1 | * | 12/2006 | Gupta ....................... 375/219 |

OTHER PUBLICATIONS

"DoubleTalk Bandwidth Compression System," Applied Signal Technology, Inc., Publication No. 097-120830-001, Jan. 2005, pp. 1-4.

(Continued)

*Primary Examiner*—Duc Nguyen
*Assistant Examiner*—Dominic E Rego
(74) *Attorney, Agent, or Firm*—Blank Rome LLP

(57) ABSTRACT

The reduction of echo noise in satellite communications includes receiving an aggregate signal from multiple remote stations, where the aggregate signal includes a transmit signal, whose bandwidth is in the range of 0.1 MHz to 66 MHz, is previously sent from a hub to the multiple receiving stations, computing a scaled, delayed and distorted replica of the transmit signal and using the replica to compensate for satellite transponder nonlinearities and reduce echo noise interference from a received aggregate signal received by the hub from the multiple remote stations.

20 Claims, 21 Drawing Sheets

OTHER PUBLICATIONS

DoubleTalk Point-to-Multipoint, Applied Signal Technology, Inc., Publication No. AN-057, Mar. 2003, pp. 1-6.

"DoubleTalk Bandwidth Compression System; Network Flexibility," Applied Signal Technology, Inc., Publication No. MAN-945; Mar. 2003, pp. i-ii and 1-7.

DoubleTalk Bandwidth Compression System; Field Trial Performance Results, Applied Signal Technology, Inc., Publication No. MAN-944; Dec. 2001, 15 pages.

John Bellamy, Subsections1.2.8 "Transmission Impairments" and 2.2.1 "DSP Applications," Digital Telephony Third Edition, 2000, pp. 32-41 and 82-83, John Wiley & Sons, Inc., New York, New York, United States of America.

V. Krichevsky and D. Difonzo, Beam Scanning in the Offset Gregorian Antenna, COMSAT Technical Review, 1982, pp. 251-269, vol. 12, No. 2, Communications Satellite Corporation, Washington, DC, United States.

P. Kumar, Depolarization of 19-GHz Signals, COMSAT Technical Review, 1982, pp. 271-293, vol. 12, No. 2, Communications Satellite Corporation, Washington, DC, United States.

A Sinha, Optimum Orbital Location of a Communications Satellite, COMSAT Technical Review, 1982, pp. 295-317, vol. 12, No. 2, Communications Satellite Corporation, Washington, DC, United States.

O. Horna, Cancellation of Acoustic Feedback, COMSAT Technical Review, 1982, pp. 319-333, vol. 12, No. 2, Communications Satellite Corporation, Washington, DC, United States.

C. Burwell and S. Gover, Hardware Simulation Facility for 120-MBits/s QPSK/TDMA System COMSAT Technical Review, 1982, pp. 335-369, vol. 12, No. 2, Communications Satellite Corporation, Washington, DC, United States.

D. Chakraborty and J. Kappes, Experimental Evaluation of Threshold Detection with Estimated Sequence Performance, COMSAT Technical Review, 1982, pp. 371-397, vol. 12, No. 2, Communications Satellite Corporation, Washington, DC, United States.

S. Chou and C. Chang, 4-GHz High-Efficiency Broadband FET Power Amplifiers, COMSAT Technical Review, 1982, pp. 399-411, vol. 12, No. 2, Communications Satellite Corporation, Washington, DC, United States.

A. Ghais et al., Summary of Intersat VI Communications Performance Specifications, COMSAT Technical Review, 1982, pp. 413-429, vol. 12, No. 2, Communications Satellite Corporation, Washington, DC, United States.

\* cited by examiner

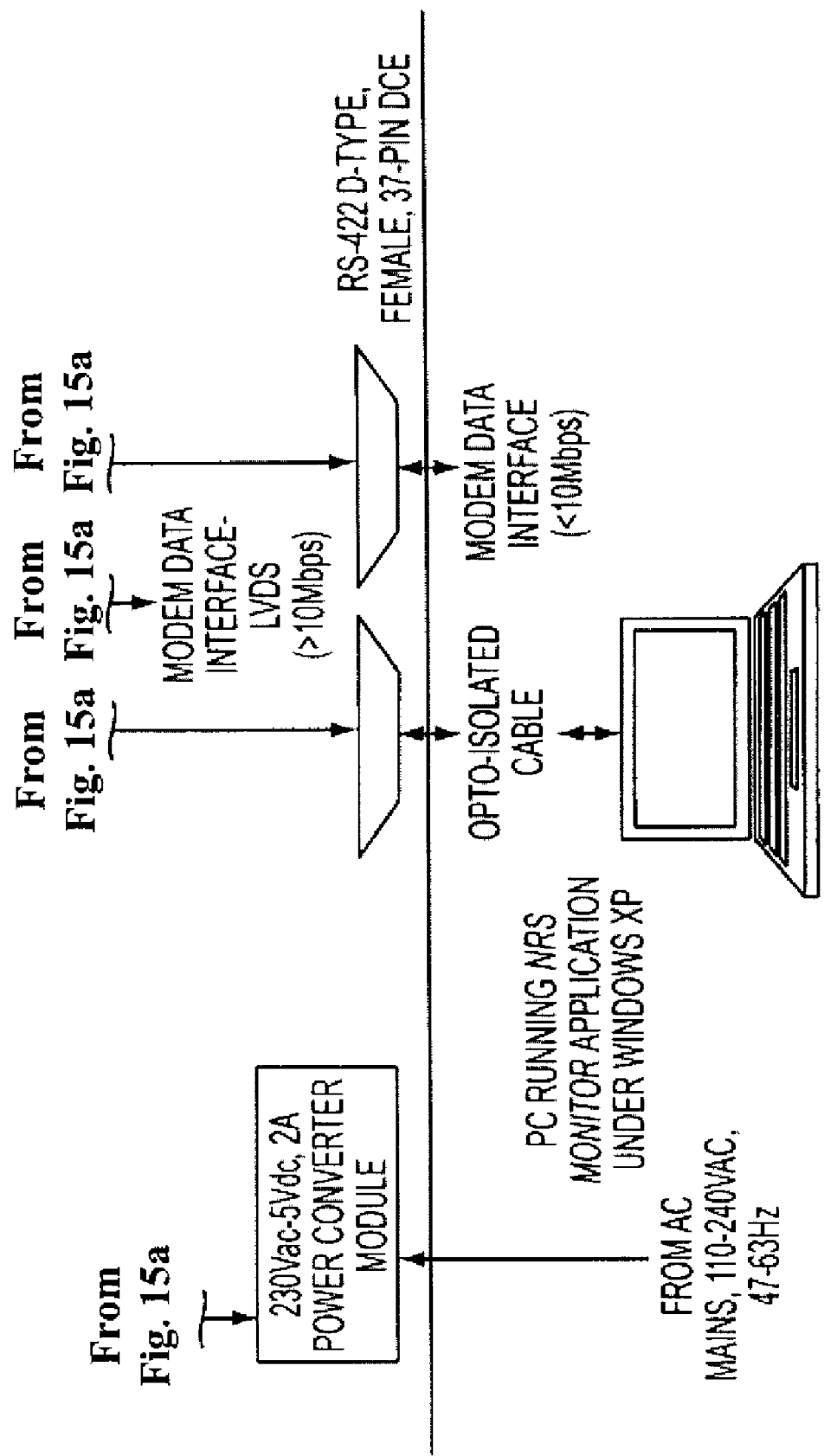

NOISE REDUCTION SYSTEM AND METHOD THEREOF

RELATED APPLICATIONS

This application is a continuation application of U.S. application Ser. No. 11/961,913, filed Dec. 20, 2007, which is a continuation of U.S. application Ser. No. 11/655,141, filed Jan. 19, 2007, which is a continuation-in-part of U.S. application Ser. No. 11/482,197, filed Jul. 7, 2006, which claims priority to provisional application Ser. No. 60/791,206, filed Apr. 12, 2006, which are hereby incorporated by reference.

BACKGROUND OF THE INVENTION

1. Field of the Invention

The present invention relates to systems used in satellite communication. More particularly, the present invention provides for the reduction of noise in satellite signals in carrier-in-carrier satellite communications.

2. Background of the Related Art

Each direction of a conventional duplex radio link typically uses different carrier frequencies. If the same frequency was used for both directions, the transmit signal, which can be 4-5 orders of magnitude larger, can swamp the received signal. In satellite relay systems, such as illustrated in FIG. 1, transmit and receive antenna dishes point narrow beams at the geostationary satellite. (In "carrier-in-carrier" satellite radio relays, with overlapped up- and down-link frequency bands, as illustrated in FIG. 2, the returned transmit signal to the intended receive signal ratio is nominally the near- to far-end antenna gain ratio multiplied by the ratio of required near- to far-end C/N (carrier-to-noise) ratios.)

VSAT networks typically consist of one or more earth stations with large diameter antennas (called "hubs" or H) that link (to each other, as well as to terrestrial networks) earth stations with N smaller antennas (called "remote stations" or $R_1$-$R_N$). The hub typically modulates a single carrier at a high rate to transmit data, via a signal H, to the remote stations using time division multiple access, while it receives the aggregate signal A containing the relatively low rate data $R_k$ signals from remote stations at different carrier frequencies. Thus, required C/N ratios are typically higher for signals emanating from the hub as compared to those from the remote stations (being nominally in the ratio of their respective data rates).

As shown in FIG. 1, the hub and the remote stations receive the aggregate signal A. The $H_d$ signal, within aggregate signal A, is a copy of the Hub's original wideband H uplink signal that has suffered from delays in time, shifts in frequency, changes in amplitude or other distortions (due to satellite transponder's non-linear amplitude and phase responses). At the remote stations the $H_d$ signal is the "desired signal". At the hub, the $H_d$ signal is an unwanted "echo" signal. The hub must subtract out a replica of the $H_d$ signal from the received aggregate signal (A) to produce the desired composite remote stations' signals plus noise and inter-modulating products.

Since the returned transmit $R_k$ signals, within aggregate signal A, are typically much weaker at the (more numerous) remote stations than the desired $H_d$ receive signal, due to both the lower transmit signal power as well as lower antenna gain, no echo reduction of any unwanted $R_k$ transmit signals is normally required at the remote stations.

While echo cancellation methodologies, as discussed above, have been employed in telephony, such systems cannot be applied wholesale to the satellite communications environment. Each suppression in telephony, such as line cancellation and acoustic echo cancellation is normally limited to 30-35 dB. Such methods are not, however, amenable to satellite echo cancellers because transponder distortion, with both normalized gain and phase approximately quadratic (at sufficient back-off) with respect to amplitude, cannot be approximated as a small-order, e.g., quadratic filter. In addition, due to the large bandwidths and high data rates of modern satellite signals, echo suppression techniques used in telephony are not practical for satellite signals. Thus, there is a need for noise reduction technology in satellite communications that can properly scale, delay and/or distort at least a portion of the transmitted signal to at least partially compensate for echo noise effects.

SUMMARY OF THE INVENTION

Accordingly, it is the primary object of the invention to reduce echo noise in satellite communications. The process includes transmitting a transmit signal, H, from a hub to multiple remote stations; receiving an aggregate signal, A, comprising the remote stations' signals, $R_1 \ldots R_N$, plus a delayed and distorted replica of the transmit signal, $H_d$; computing a scaled, delayed and distorted replica of the transmit signal and using the replica to compensate for satellite transponder nonlinearities and perform echo noise reduction on the aggregate signal received by the hub from the satellite. The process is linear such that it supports the operational scenarios illustrated in FIGS. 3a-3d.

In some embodiments, the computing step includes decimating the received aggregate signal through a series of filters that are dependent on the bandwidth of the received aggregate signal. In addition, the method can also include determining whether the transmit signal is present in the aggregate signal and performing the computing step when it is determined that the transmit signal is present.

The computing step may include correcting for distortion in the aggregate signal by determining normalized gain and phase error in the aggregate signal to compute the replica of the $H_d$ signal. The computing step may also include performing Doppler tracking by determining a conjugate of the aggregate signal to determine a Doppler shift and applying the Doppler shift to compute the replica. Also, the computing step may include determining a delay in the aggregate signal by computing at least mean square fractional sample of the aggregate signal and tracking changes therein to determine the delay.

In additional embodiments, a system for echo noise interference reduction in satellite communications is also disclosed having receiving means for receiving an aggregate signal from multiple remote stations, where the aggregate signal includes a transmit signal previously sent from a hub to the multiple receiving stations, computing means for computing a scaled, delayed and distorted replica of the transmit signal and echo noise reduction means for using the replica to reduce echo noise from a received aggregate signal received by the hub from the multiple remote stations. The determining step further includes applying a block conversion to the transmit signal to form the replica occupying a predetermined frequency range.

In additional embodiments, an article of manufacture, having a computer-readable medium having stored thereon instructions for compensating for satellite transponder nonlinearities and reducing echo noise in satellite communications, the instructions which, when performed by a processor, cause the processor to execute the steps receiving an aggregate signal from multiple remote stations, where the aggregate signal includes an echo of the transmit signal previously sent from a hub to the multiple receiving stations, computing a scaled, delayed and distorted replica of the echo signal and using the replica to compensate for satellite transponder non-linearities and reduce echo noise from a received aggregate signal received by the hub. The determining step further includes applying a block conversion to the transmit signal to form the replica occupying a predetermined frequency range.

These and other objects of the invention, as well as many of the intended advantages thereof, will become more readily apparent when reference is made to the following description, taken in conjunction with the accompanying drawings.

BRIEF DESCRIPTION OF THE FIGURES

FIGS 15a-15b illustrate an exemplary hardware block diagram in accordance with preferred embodiments of the invention.

DETAILED DESCRIPTION OF THE PREFERRED EMBODIMENTS

Figure 1:
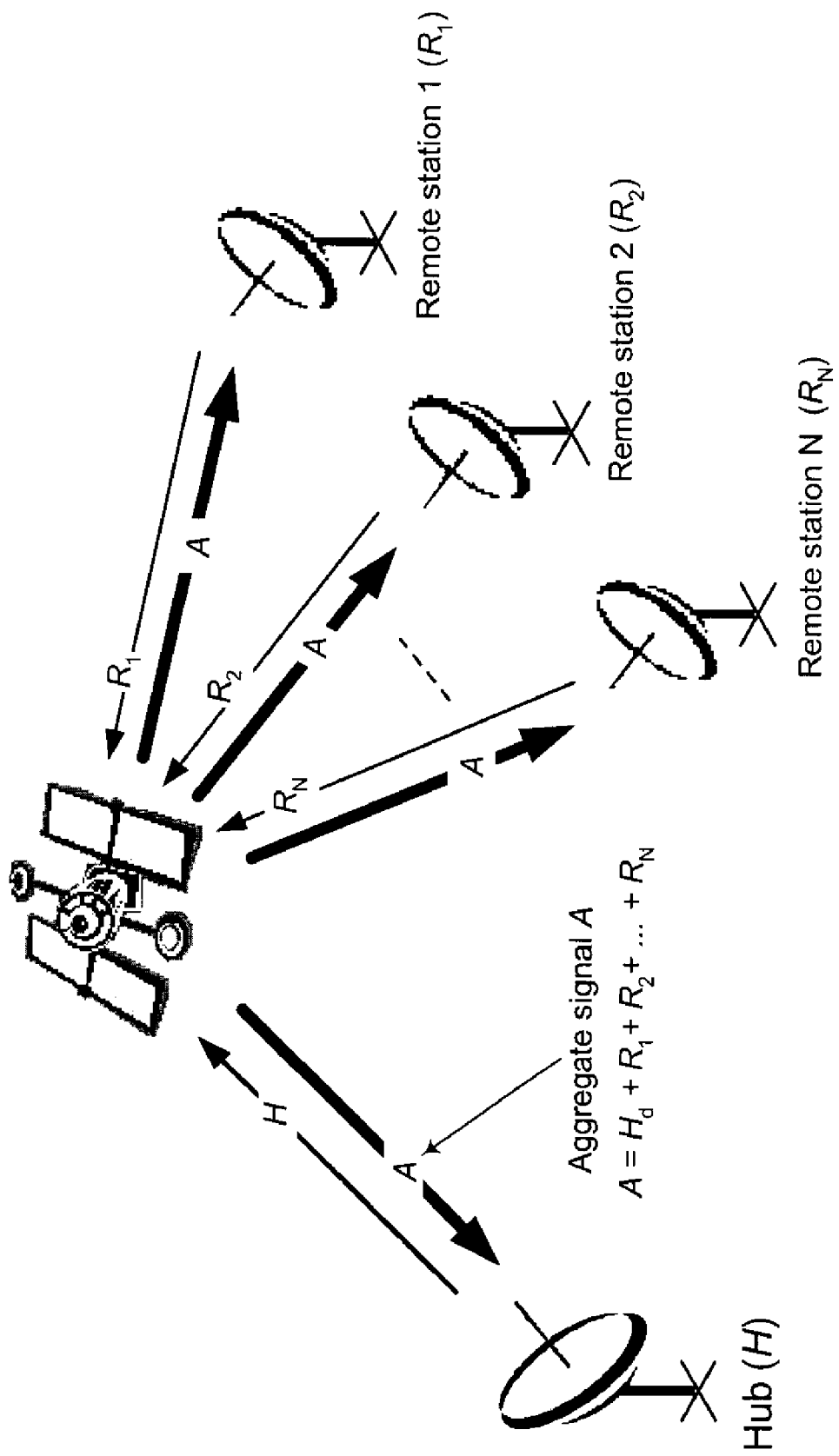
FIG. 1 shows a satellite communications system in accordance with embodiments of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose.

Figure 2:
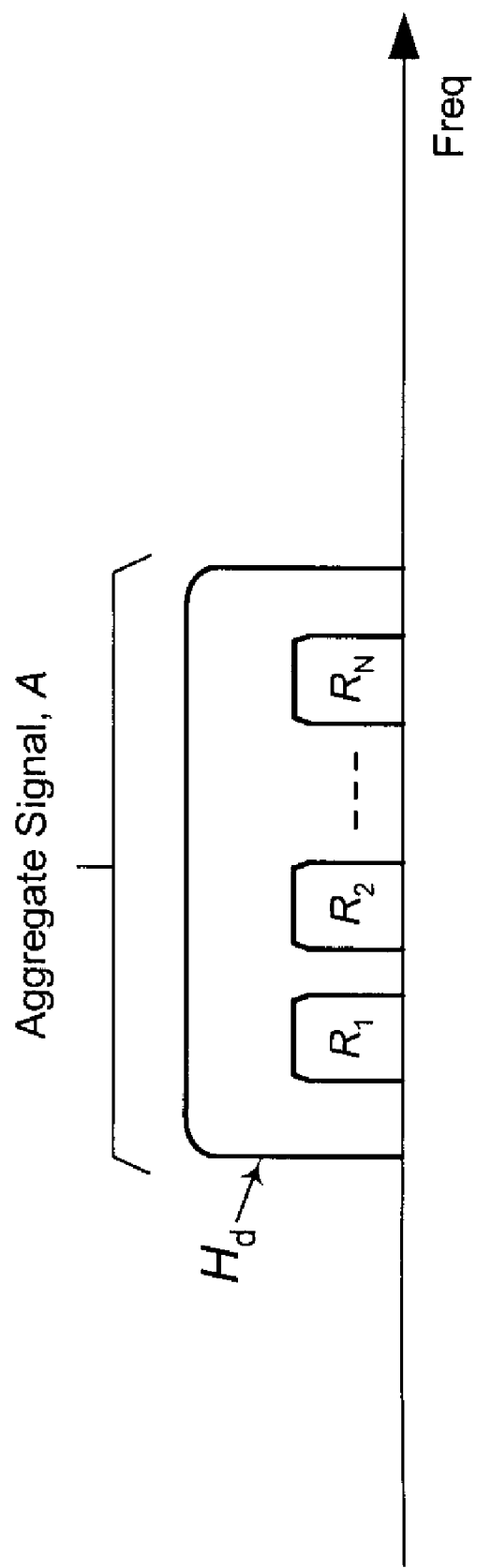
FIG. 2 illustrates a carrier-in-carrier signals used in the satellite communications system in accordance with embodiments of the invention.

The present invention acts to reduce noise through echo noise reduction. If the signal $H_d$, as illustrated in FIG. 2, is considered as being an interfering echo signal within signal A, then the extraction of the desired $R_N$ signals is achieved by echo reduction. That is, the Noise Reduction System (NRS) removes signal $H_d$ (by way of subtraction), at the hub, from the received aggregate signal A. The NRS continually tracks, and compensates for, the dynamic differences between the H and $H_d$ signals' parameters to minimize the bit error rate (BER) degradation of each of the demodulated $R_k$ signals. In certain embodiments, the transmit signal has a bandwidth of 25 MHz or 66 MHz and can also utilize transmit signals with bandwidths below those values.

Figure 3A:
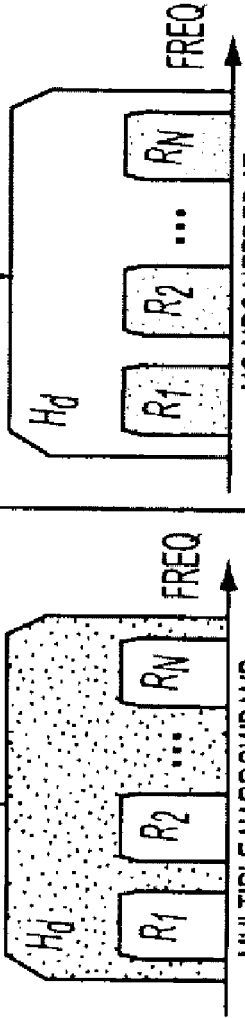
FIGS. 3a-3d show the operational scenarios for a noise reduction system in accordance with preferred embodiments of the invention.
Figure 3B:
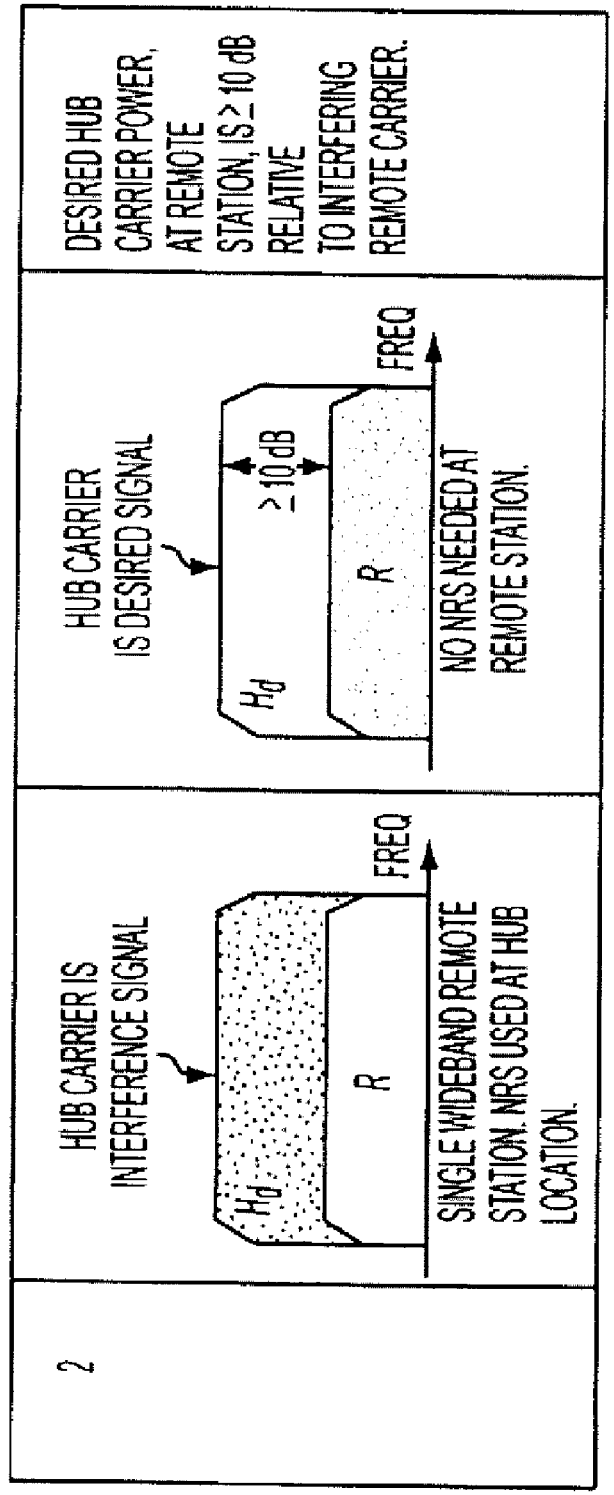
Figure 3C:
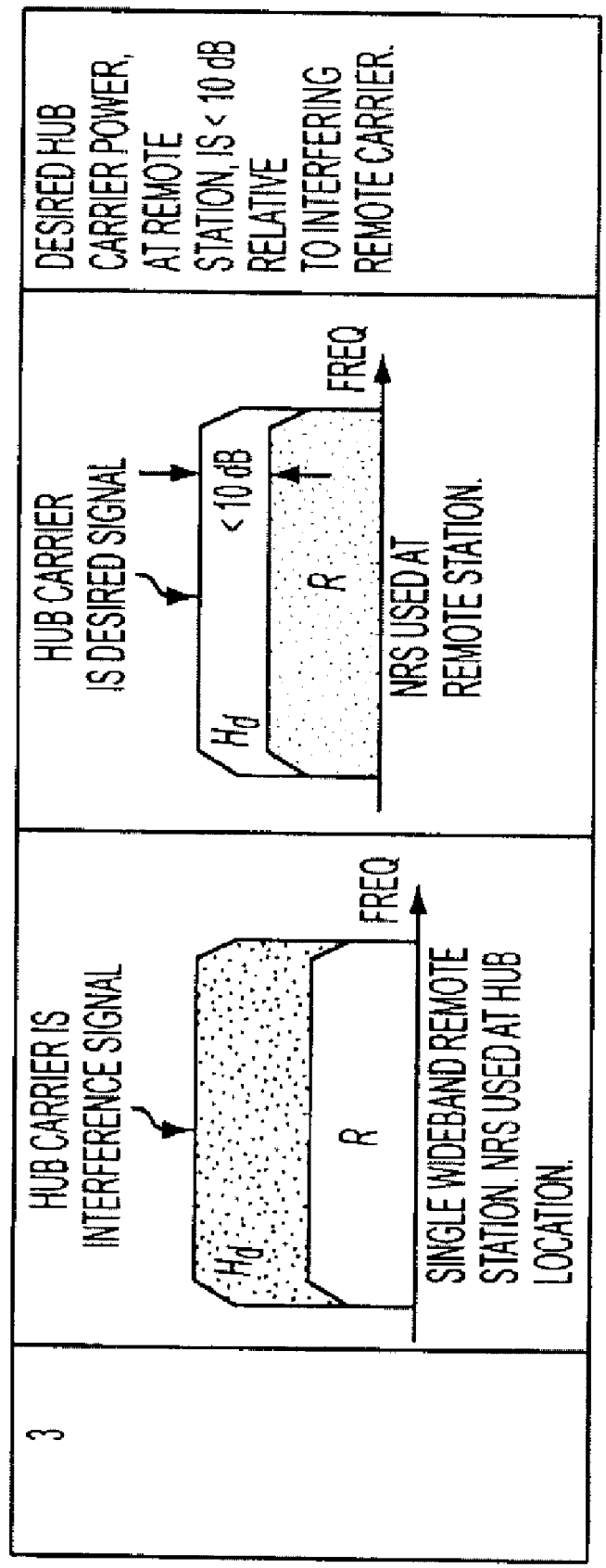
Figure 3D:
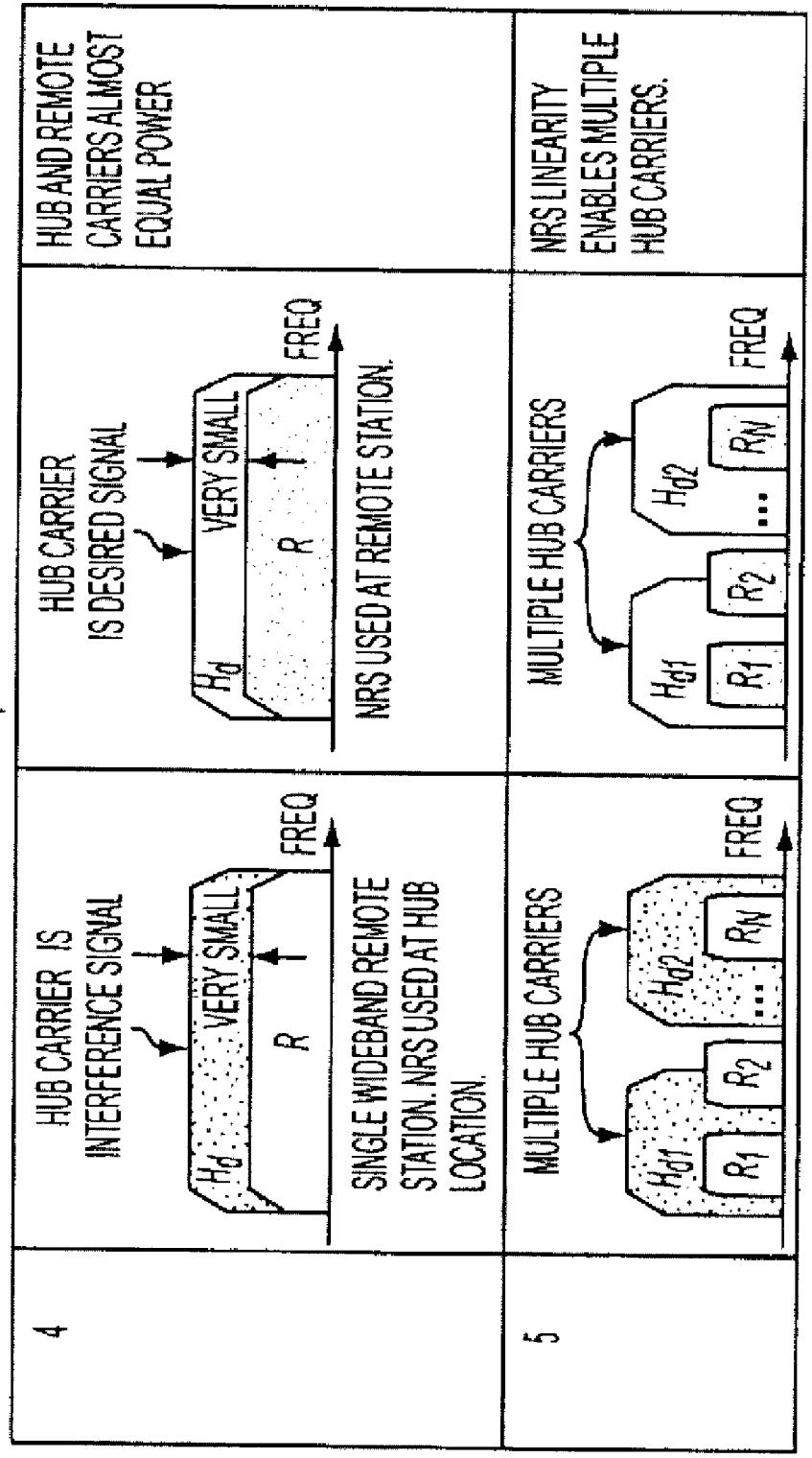

The present invention utilizes a process that is linear such that it supports the operational scenarios illustrated in FIGS. 3a-3d. In the first operational scenario shown in FIG. 3a, the signal received by the hub station is from multiple narrow-band remote stations and NRS is used at the hub location, but is not needed at the remote stations where the hub carrier power at the remote stations is large relative to the interfering remote carriers. In the second scenario shown in FIG. 3b, a single wideband remote station is involved and NRS is employed at the hub but not needed at the remote stations where the difference between the desired hub carrier power at the remote stations and the interfering remote carrier is greater than or equal to 10 dB. The third scenario shown in FIG. 3c is identical to the second with the exception that the difference between the desired hub carrier power at the remote stations and the interfering remote carrier is not greater than or equal to 10 dB, and thus NRS is used at the remote station. In scenario four shown in FIG. 3d, the difference is very small, because the hub and remote carriers are at almost equal power, and NRS is used at both the remote station and the hub. Scenario five illustrates the above discussed scenarios can be applied to multiple hub carriers since the NRS functions linearly.

Figure 4:
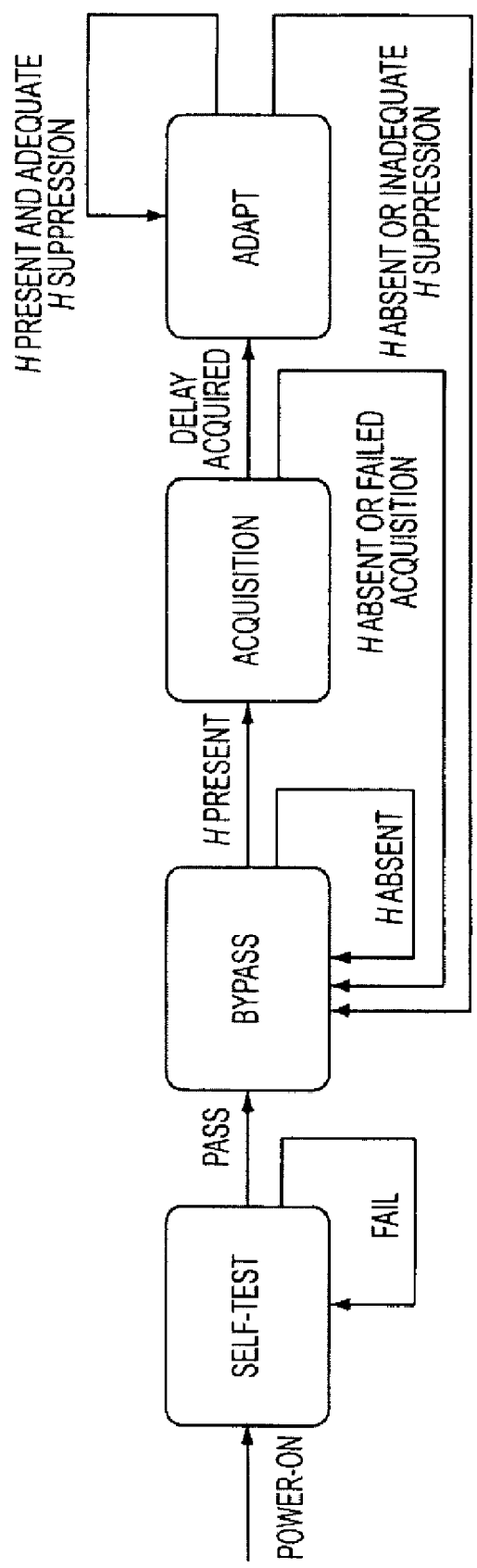
FIG. 4 shows a state transition diagram for a noise reduction system in accordance with preferred embodiments of the invention.

The overall signal processing chain for the present invention is illustrated in FIG. 4. Illustrated are four states, namely self-test, acquisition, adapt and bypass. On power on, a self-test is run and the system passes to the next stage unless there is a failure. The next stage, the bypass stage, determines whether the carrier channel H is present or there is a problem in later stages. The next stage, acquisition, obtains the H signal so that it can be modified. Thereafter, the adapt stage suppresses the $H_d$ echo signal from the received signal A and tracks and compensates for changes therein. A more detailed signal process structure for the present invention is discussed below.

Figure 5A:
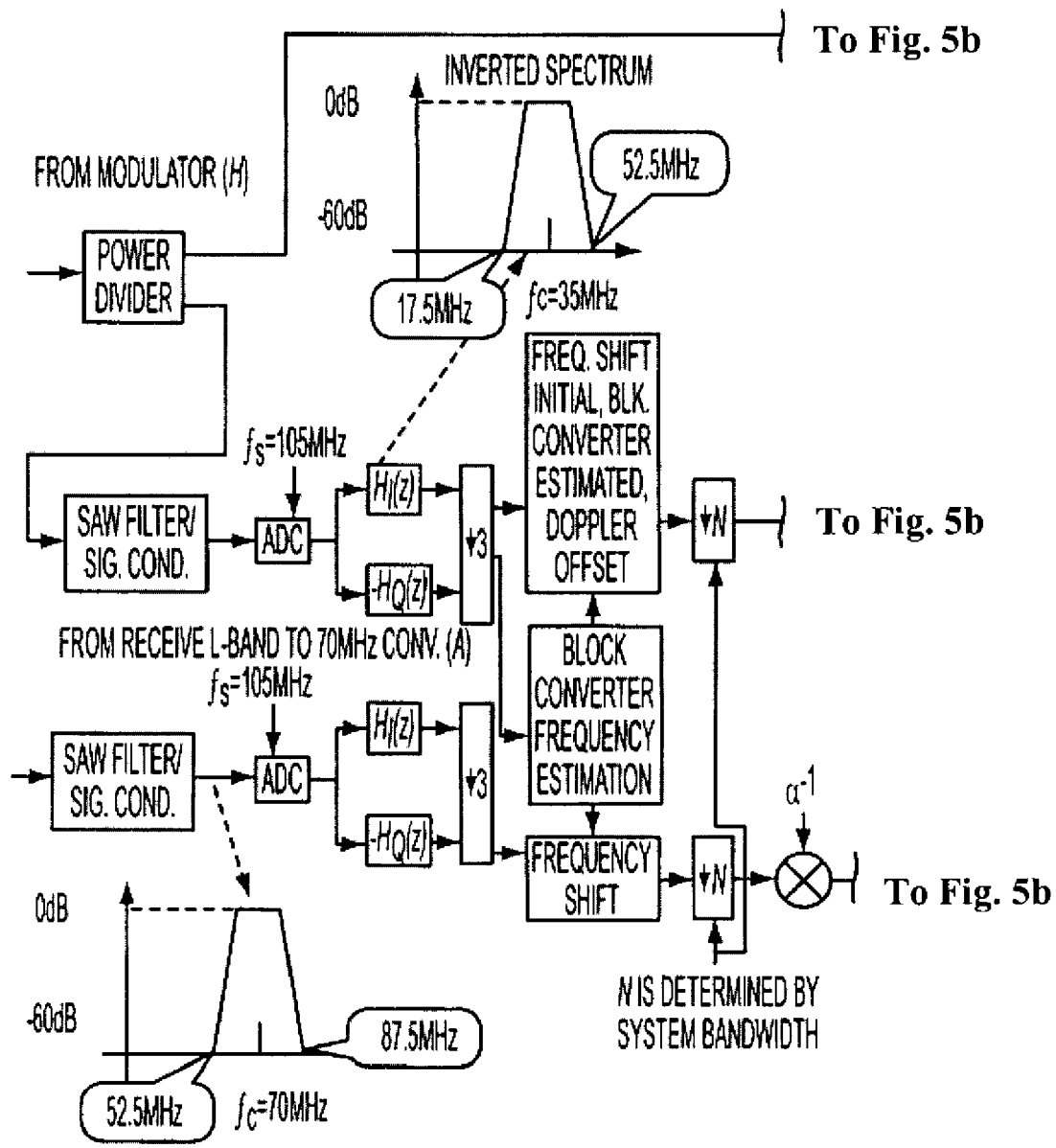
FIGS. 5a-5c show the overall signal processing chain for the noise reduction system in accordance with preferred embodiments of the invention.
Figure 5B:
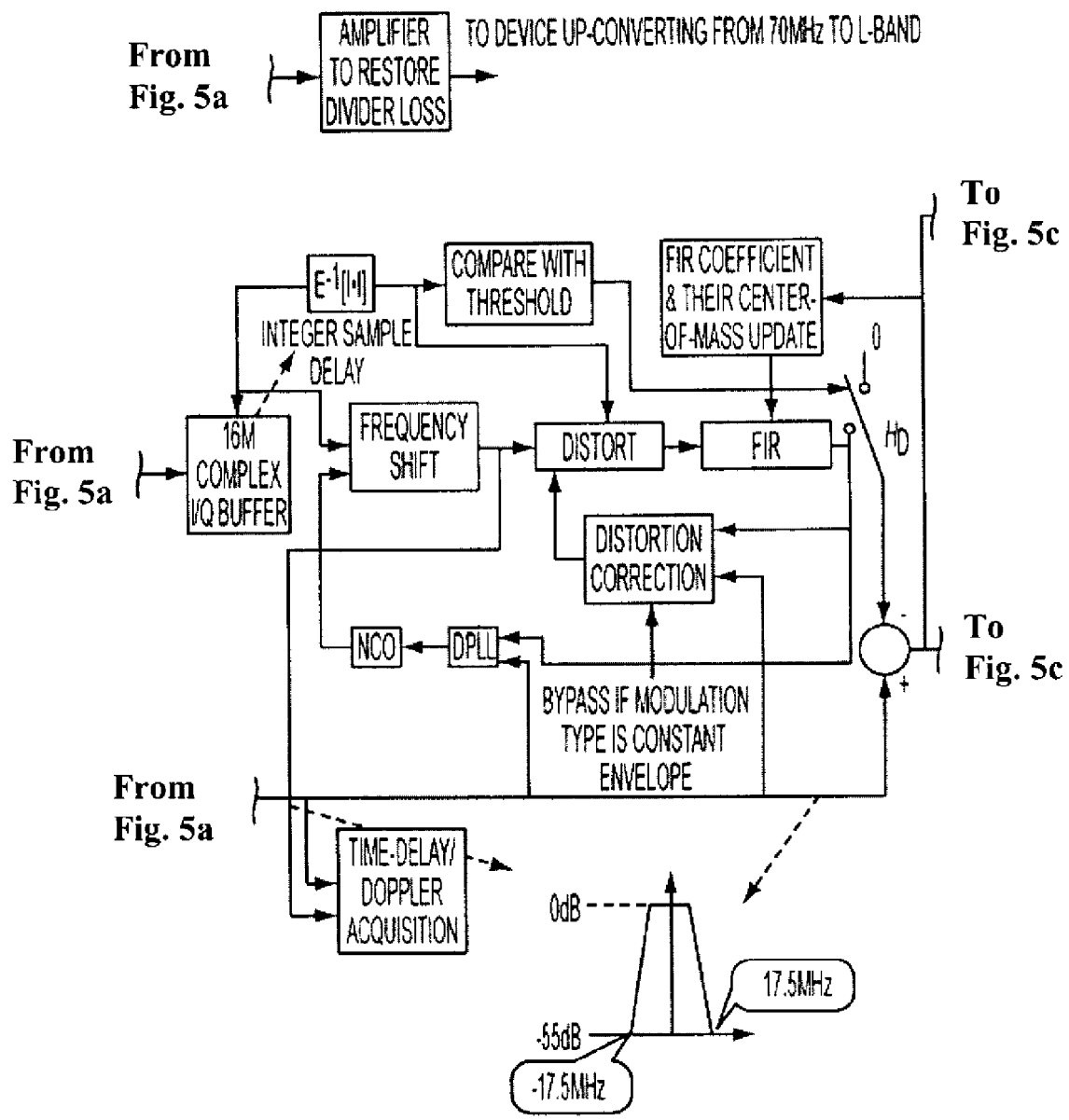
Figure 5C:
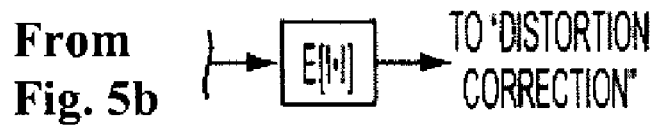
Figure 5C:
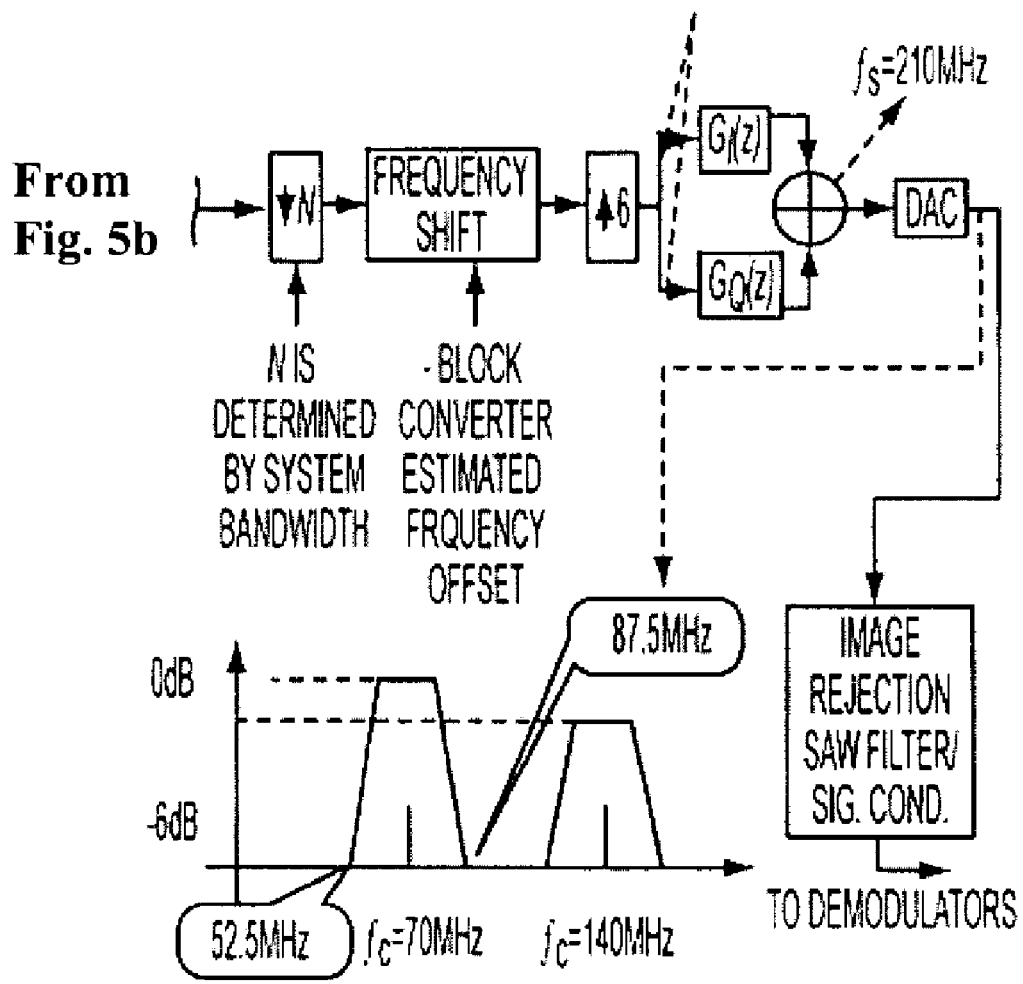

A functional block digram of the present invention is shown in FIGS. 5a-5c, according to certain embodiments of the invention. The function of the system will delay in time, shift in frequency, and amplify/attenuate the H signal to generate an Estimated $H_d$ signal that is as similar as possible to the $H_d$ signal. This echo noise reduction methodology is preferably used in satellite relay systems following the recent availability of computational resources to process $3\times10^7$ Hz bandwidth satellite signals and memory resources to store transmitted data for the 300 ms satellite channel delay at $35\times10^6$ complex samples/sec.

The general concepts of the noise reduction system of the present invention are discussed herein. For network configuration such as that illustrated in FIG. 1, where the Hub's antenna diameter is larger then the Remote's antenna diameter, the $R_k$ signals transmitted by the Remote Stations are lower power than the Hub's H transmitted signal, in that case the carrier-to-interference relation received at the remote station could be enough to recover the Hub carrier. Thereafter, the effect at the hub carrier of the remote signal is determined. The power composes (A) at satellite modem input is given by:

$$A = H_d + R_1 + \cdots + R_N = H_d + R_{Comp} \quad (1)$$

where, $R_{Comp}$=total remote carriers' powers compose transmitted inside Hub Carrier, H=Hub carrier power transmitted, and $R_n$=Remote carrier power transmitted for a remote station n.

Thereafter, N is the maximum number of remote carriers (R) hidden in the Hub carrier that is given by:

$$N = \frac{W_{S_H}}{W_{S_R} * f_g} = \frac{W_{S_H}}{W_{S_R}} * \frac{1}{f_g} \quad (2)$$

where, $W_{S_n}$=Hub Carrier Bandwidth (Symbol Rate), $W_{S_R}$=Remote Carrier Bandwidth (symbol Rate), $W_R = W_{S_R} * f_s$ is the Satellite Allocated Bandwidth for a Remote carrier ($R_n$) and $f_g$=Guard Factor (bandwidth spacing between adjacent remote carriers)=1, 4 times the most frequency value used.

In addition:

$$\frac{H_d}{R_{Comp}} = \frac{H_d}{(R_1 + R_2 \ldots R_n)} \quad (3)$$

Thereafter considering the case where $R_1 = R_2 = \bullet\bullet = R_N$, this result in:

$$\frac{H_d}{R_{Comp}} = \frac{H_d}{(R_1 + R_2 \ldots R_n)} = \frac{H_d}{N \times R} = \left(\frac{H_d}{R}\right) * \left(\frac{1}{N}\right) \quad (4)$$

$$\frac{H}{R_{Comp}} = \left(\frac{H}{R}\right) * \left(\frac{1}{N}\right) = \left(\frac{H}{R}\right) * \left(\frac{1}{\frac{W_{S_H}}{W_{S_R} * f_g}}\right) = \left(\frac{\frac{H}{W_{S_H}}}{\frac{R}{W_{S_R}}}\right) * f_g \quad (5)$$

where:

$$\left(\frac{R}{W_{S_R}}\right) = R_o$$

Remote Signal Power Density $$\left(\frac{R}{W_{S_R}}\right) = H_o$$

Hub Signal Power Density and $f_g$=Guard factor among an R carrier. Then equation (5) can be rewritten as:

$$\frac{H_d}{R_{Comp}} = \left(\frac{H_o}{R_o}\right) * f_g \quad (6)$$

Because the Hub's wideband signal H, in the form of $H_d$, is higher power within the aggregate signal A than the Remote Stations' $R_k$ signals, it can be demodulated by the Remote Stations.

$$\left(\text{Ratio}\left(\frac{H_o}{R_o}\right)\right)$$

represents the power density difference between remote and Hub Carrier as seen using a spectrum analyzer.) Then equating (6) can be written in a relative way as:

$$\frac{H_d}{R_{Comp}} = E * f_g \text{ or} \quad (7)$$

$$\frac{H}{R_{Comp}} = E_{dB} + F_{dB} \quad (8)$$

In accordance with the satellite link calculation, it can be said that the power density ratio (or $E_{dB}$) will depend of: antennas size, Modulation Type and Code forward error correction (FEC) used in the satellite link.

There fore in this way the new $$\left(\frac{C}{N}\right)_{Total}$$

in the remote station will be given by:

$$\left(\frac{C}{N}\right)_{Total}^{Remote} = \left(\frac{C}{N}\right)_{UP} \otimes \left(\frac{C}{N}\right)_{Down} \otimes \left(\frac{C}{I_M}\right) \otimes \left(\frac{C}{N}\right)_{Rcomp} \quad (9)$$

where:

$$\left(\frac{C}{N}\right)_{Rcomp} - \frac{H_d}{R_{Comp}} \quad (10)$$

$$Z = X \otimes Y = 10\text{Log}\left[\frac{1}{10^{\frac{X}{10}}} + \frac{1}{10^{\frac{Y}{10}}}\right] \quad (11)$$

$(C/N)_{Rcomp}$ represents the new noise interference or degradation value added at satellite link.

Turning now to an analysis of the hub station interference, it can be assumed that the power density of the signal H is given by:

$$H_o = \frac{H}{W_{S_H}} \quad (12)$$

The total interference power ($I_H$) of (II) signal over a remote carrier (R) is given by:

$$I_H = H_o * W_{S_R} = \left(\frac{H}{W_{S_H}}\right) * W_{S_R} = H * \left(\frac{W_{S_R}}{W_{S_R}}\right) \quad (13)$$

The power relation between remote and Hub signals interference received at the Hub station can be written as:

$$\frac{R}{I_H} = \frac{R}{H * \left(\frac{W_{S_R}}{W_{S_H}}\right)} = \left(\frac{R}{H}\right) * \left(\frac{W_{S_H}}{W_{S_R}}\right) \quad (14)$$

$$\frac{R}{I_H} = \frac{\left(\frac{R}{W_{S_R}}\right)}{\left(\frac{H}{W_{S_H}}\right)} \quad (15)$$

Thus:

$$\left(\frac{R}{W_{S_R}}\right) = R_o$$

Remote Signal Power Density $$\left(\frac{R}{W_{S_R}}\right) = H_o$$

Hub Signal Power Density

Replacing $R_o$ and $H_o$ in equation (13), we have:

$$\frac{R}{I_H} = \left(\frac{\left(\frac{R}{W_{S_R}}\right)}{\left(\frac{H}{W_{S_H}}\right)}\right) = \frac{R_o}{H_o} = \frac{1}{\left(\frac{H_0}{R_o}\right)} \quad (16)$$

where:

$$\left(\frac{H_o}{R_o}\right)$$

Represents $E_{dB}$; then (2.5) can be written in a relative way as:

$$\frac{R}{I_H} = \frac{1}{\left(\frac{H_0}{R_o}\right)} = \frac{1}{E}, \quad \text{or} \quad (17)$$

$$\frac{R}{I_H} = -E_{dB} \quad (18)$$

In the hub side after the canceller system, the $H_d$ hub signal interference will be attenuated by Z dB (Attenuation factor). Then, the relation given by equation (16) will be modified as:

$$\frac{R}{I_{C_H}} = \frac{1}{\left(\frac{H_0}{\frac{z}{R_o}}\right)} = \frac{1}{\left(\frac{H_o}{R_o}\right)} * z = \frac{z}{E} \quad \text{or} \quad (19)$$

$$\frac{R}{I_{C_H}} = Z_{dB} - E_{dB} \quad (20)$$

Therefore in this way the new C/N in the hub station will be given by:

$$\left(\frac{C}{N}\right)_{Total}^{Hub} = \left(\frac{C}{N}\right)_{UP} \otimes \left(\frac{C}{N}\right)_{Down} \otimes \left(\frac{C}{I_M}\right) \otimes \left(\frac{C}{I_H}\right)_{Hcaccire} \quad (21)$$

where $$\left(\frac{C}{I_H}\right)_{Hcaccire}$$

represents the new noise interference or degradation value added at satellite link for Hub Carrier.

Figure 6:
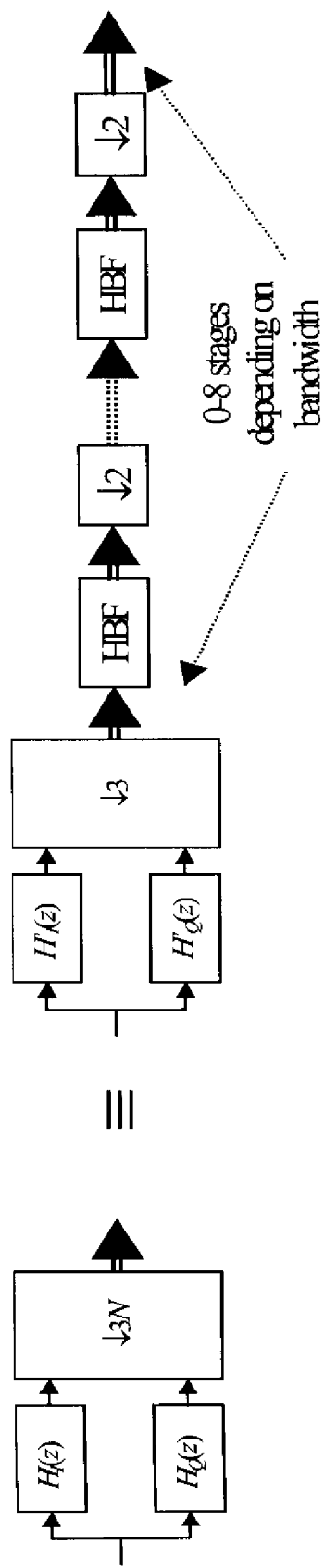
FIG. 6 provides an expansion of the decimating filters illustrated in FIGS. 5a-5c.
Figure 7:
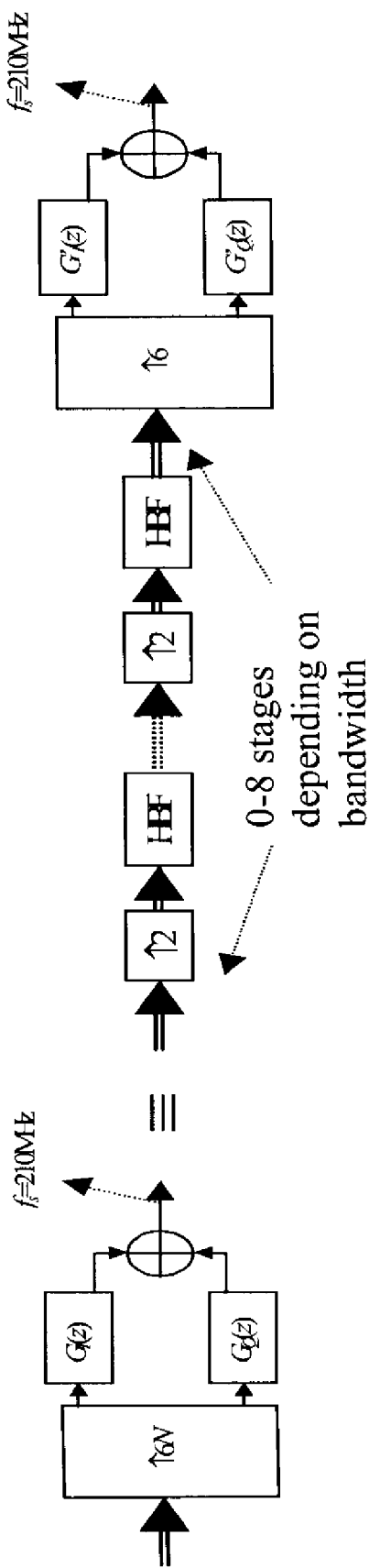
FIG. 7 provides an expansion of the interpolating filters illustrated in FIGS. 5a-5c.

Aspects of the reduction of satellite echo signals include delay (to ±½ sample) and Doppler acquisition, time (including fractional sample) delay and Doppler tracking. The suppression by incorporating low-complexity distortion compensation into the echo reduction process is further shown in FIGS. 5a-5c. Both signals H and A are digitized at the IF frequency of 70 MHz, SAW filtered, quadrature down-converted, and decimated (by a factor consistent with signal bandwidth) to obtain complex base-band samples. The decimating filters are expanded in FIG. 6, where the number of stages applied depends on the bandwidth. At the output of the echo reduction process, signals are interpolated, as illustrated in FIG. 7, where that interpolation is also a function of the bandwidth and uses an equivalent number of stages.

The baseband signal H enters a buffer that accounts for integer sample delay (that is initially acquired and subsequently tracked), then distorted prior to being frequency shifted and fractional-sample delayed (by an adaptive FIR filter) to generate a replica of $H_d$, before being subtracted from A to yield the baseband signals $R_k$. This signal may then be up-converted back to IF for presentation to remote-station demodulators/decoders, where other processing can further mitigate distortion effects on each $R_k$.

Figure 8:
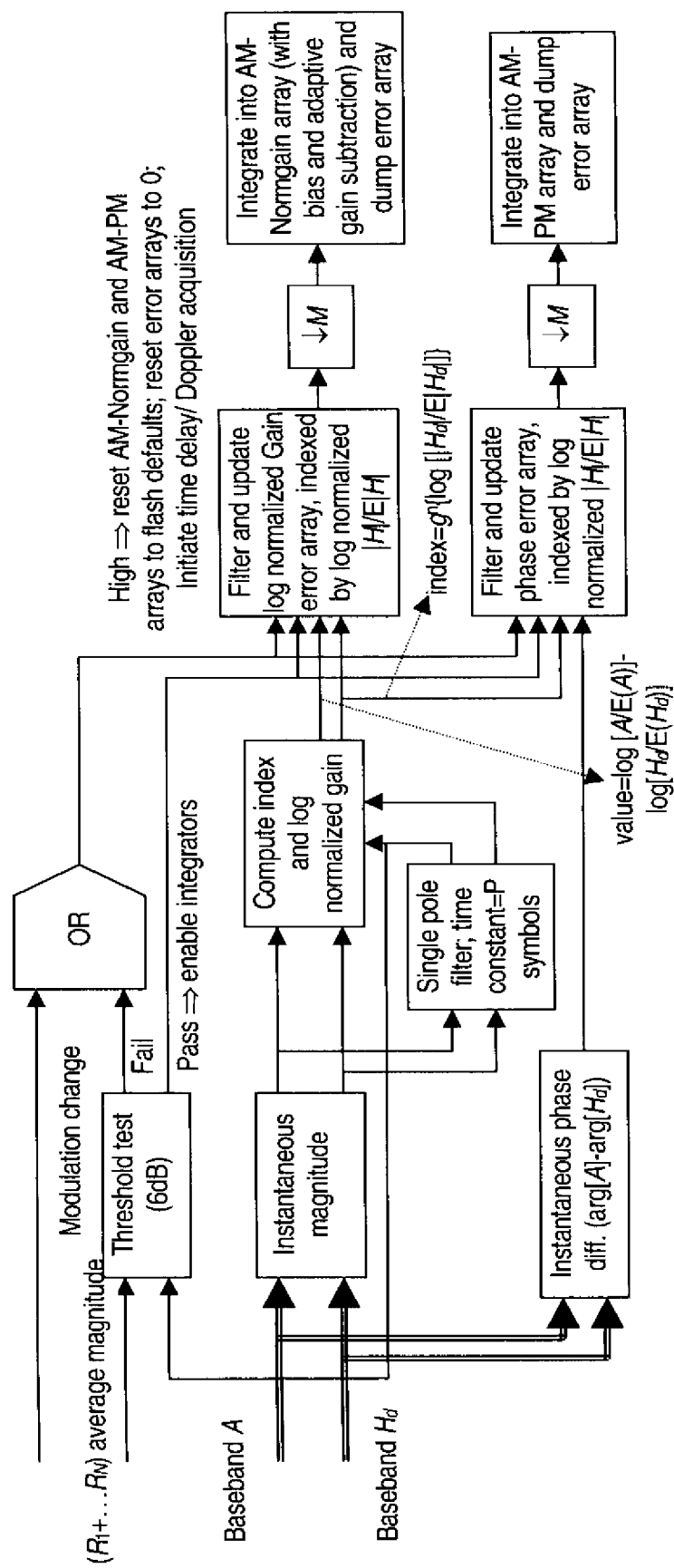
FIG. 8 shows a residual amplitude and phase distortion estimation and correction module in accordance with preferred embodiments of the invention.

FIG. 8 describes the process by which the LMS delay equalizer output, $H_d$, time-aligned to A, is used to iteratively update estimates of AM-Normgain and AM-PM curves. Log normalized |H| is inferred from log normalized |$H_d$| through fixed-point iteration in the AM-Normgain array, f, i.e., if $g\{\bullet\}=\{\log(|H_d|/E|H_d|)-f(\bullet)\}$, then fixed-point iteration is $g\{g\{\ldots\}\}=g^n(\bullet)$ until $g^n\{\log(|H_d|/E|H_d|)\}+f\{g^n[\log(|H_d|/E|H_d|)]\}-\log[|H_d|/E|H_d|]$ is less than a resolution threshold (e.g., ⅙ dB ) or $g^n\{\log(|H_d|/E|H_d|\}$ exceeds an upper limit (e.g., 4 dB).

The AM-Normgain correction array, indexed by log normalized |H|, is updated by filtering (e.g., using a dc unity gain, first-order filter) $\log(|A|/E|A|)-\log(|H_d|/E|H_d|)$. This array is periodically integrated into the AM-Normagain array, after bias subtraction and adaptive filter gain compensation. AM-Phase correction array update is based on arg(A)-arg(H). The envelope estimate of R is also biased by excess mean square error (MSE) from the fractional sample delay adaptation; thus, R's envelope divided by $(1+\mu L\sigma_{H'}^2)^{0.5}$ is N's.

Finally, to minimize noise effects on the final map, the AM-Normgain and AM-PM arrays are forced to least probability weighted squares polynomial (e.g., for the nonlinear satellite channel, parabolic fits, $y=1-az^2$, $0<a<a_{max}$ and $\phi=bz^2$, $0<b<b_{max}$) of normalized envelopes.

Figure 9:
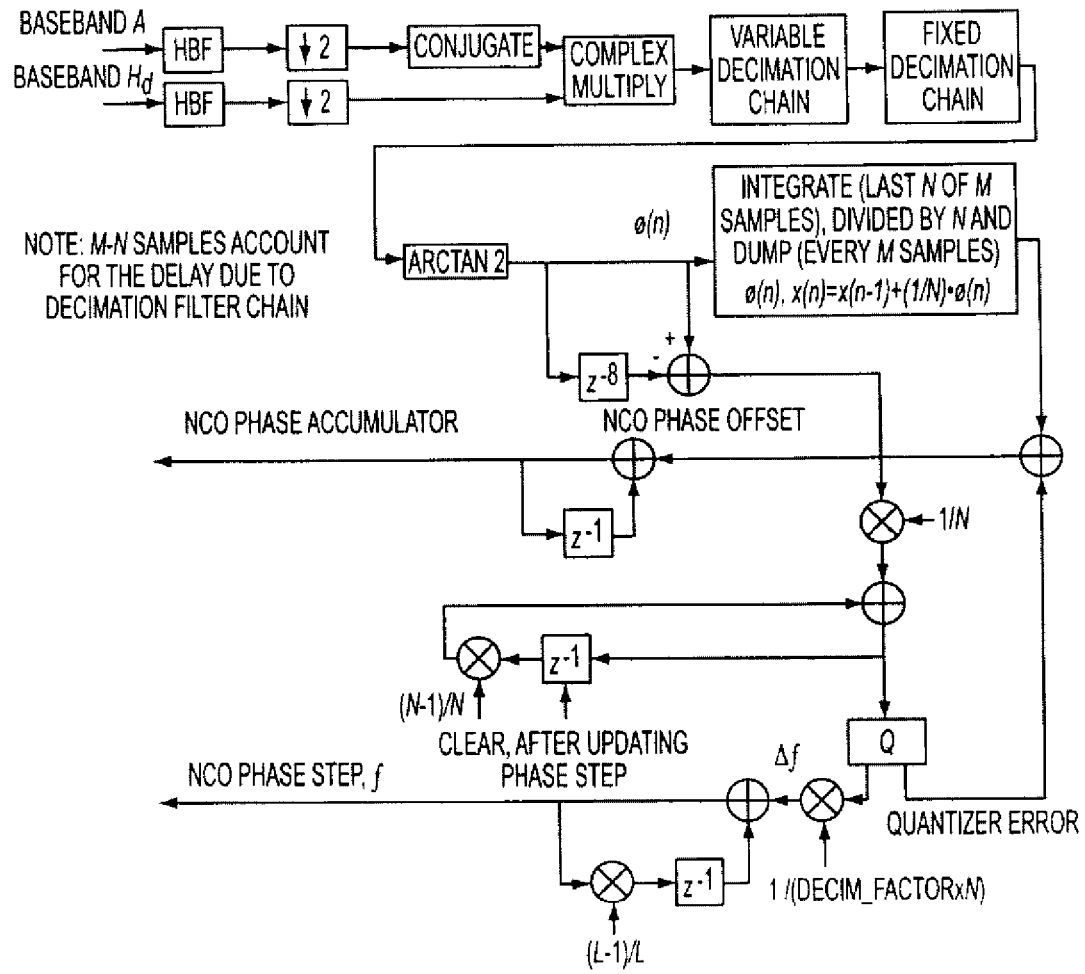
FIG. 9 shows a Doppler tracking module according to preferred embodiments of the invention.

FIG. 9 illustrates a delayed phase-locked loop for Doppler tracking. One of the half-band filter (HBF) stages of the fixed decimation is implemented on the two channels prior to the complex multiplication block; the variable chain and 5 stages of the fixed decimation chain are after the multiplication block to reduce computational burden. The bandwidth-dependent "remainder" (with 8-0) stages of the 0-8 half-band decimation chain, the HBF block, depicted in FIG. 9 is used as the "variable decimation chain". The "fixed decimation chain" consists of 5 stages of the half-band filter followed by a decimation of 2 (for an overall decimation of 32).

Fractional sample time delay (of H') inclusion in adaptive filters is performed, where the integer sample delay is initially obtained by an initial time delay estimation (such as, by a FFT-based ambiguity function/cross-correlation computation) and subsequently the integer sample closest to the adaptive filter's weight vector's centroid is tracked. Suppose that $H_k \in Z^L$ is stationary zero-mean vector random process with autocorrelation matrix $\Omega=E[H'_k H'^T_k]\forall k$, the reference signal, $A_k \in Z$, being a stationary zero-mean scalar random process and $w_k \in R^L$ is the weight vector at the kth time step.

Figure 10:
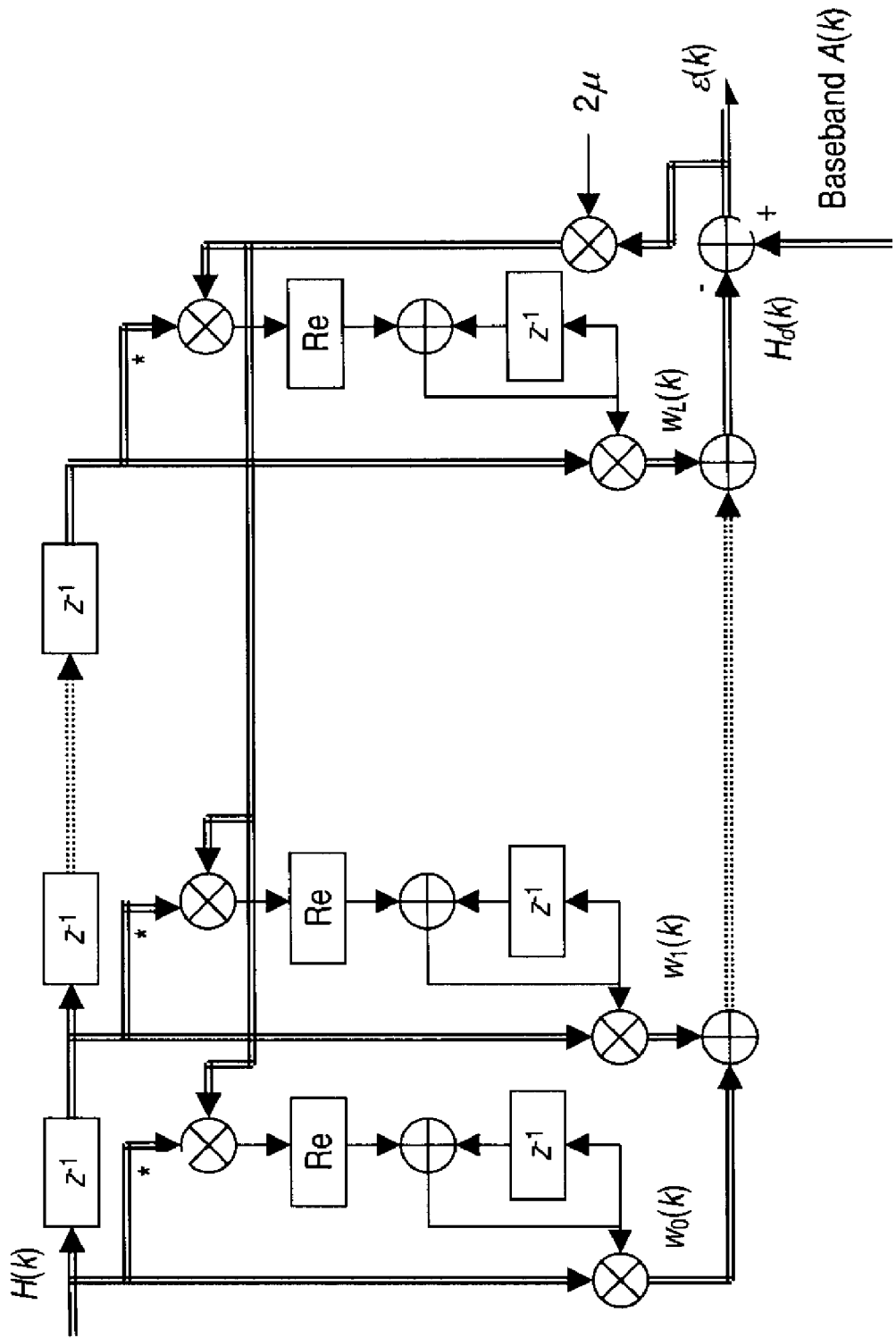
FIG. 10 shows a least mean square (LMS) update module in accordance with preferred embodiments of the invention.

For this adaptive filter, the error is $\epsilon_k = A_k \Sigma w_k H_k$, $w_k \in R^L$. Assume that $H'_k$ and $A_k$ are stationary with cross-correlation vector $p=E[A_k \cdot H'_k]\forall k$. Using a MSE cost function $\xi=E|\epsilon_k|^2=E|A_k|^2-2p^T w+w^T \Omega w$, it is easily shown that for full rank $\Omega$, the weight vector that minimizes $\xi$ is $w^{opt}=\Omega^{-1}p$. The MSE when using $w^{opt}$ is denoted as $\xi^{opt}$. The Widrow-Hopf LMS algorithm, as illustrated in FIG. 10, estimates $w^{opt}$ when $\Omega$ and p are unknown using an instantaneous error $|\epsilon_k|^2$ via $w_{k+1}=w_k-2\mu Re\{\epsilon_k H'^*_k\}$, with * connoting complex conjugate.

For large enough k, i.e., in steady state, for an arbitrary initial $w_0$, $E[w_k]=w^{opt}$ when $0<\mu\leq[3Tr(\Omega)]^{-1}$, with $w_k$ exhibiting Brownian motion around $w^{opt}$, the excess MSE is approximated by $\xi_{excess}=\mu\xi^{opt}Tr(\Omega)$. It is preferable to separate the attenuation factor, $\alpha$, of $H_d$ in A (by multiplying A by $\sigma_H/(2\sigma_A)<\alpha^{-1}<\sigma_H/\sigma_A$) from the time delay adaptation.

The matrix $\Omega$ of $H'_k$ (for the outbound communication signal) is tri-diagonal when the signal is over-sampled by a factor less than 2. All principal diagonal terms being positive and greater than off-diagonal terms ensure $\Omega$'s full rank, and thus, with $\mu\leq[3L\sigma_{H'}^2]^{-1}$, $\xi_{excess}=\mu\xi^{opt}L\sigma_{H'}^2$.

Figure 11:
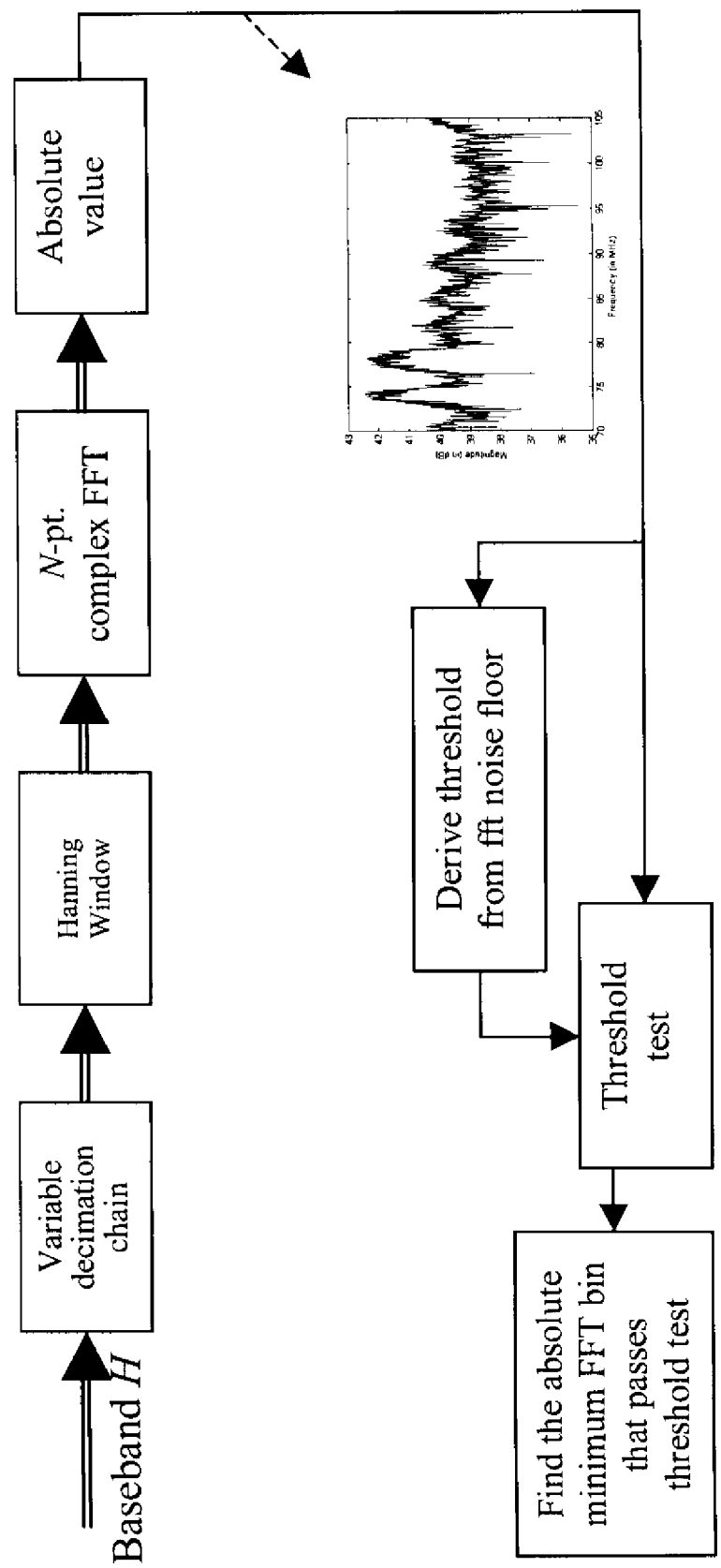
FIG. 11 shows a block converter frequency acquisition module in accordance with preferred embodiments of the invention.

FIG. 11 illustrates a block converter frequency acquisition module. An FFT on the (potentially decimated) H signal determines required block conversion to assure that, after block conversion, the H signal occupies the 70 MHz frequency. Time delay is acquired by FFT-based computation of cross-correlations between signal H and A. A 3-pass (each with a different time scale and positive residual lag) approach to time delay and Doppler estimation is adopted because the computational complexity to compute cross-correlations over a 220 ms to 280 ms span, at 35 million complex samples/s, overwhelms the computational power and on-chip memory of any current processing engine, sorting through the multitude of correlation peaks in a single-pass scheme is complex and achieving fine Doppler acquisition (over a ±8500 Hz range) would require an unreasonably large FFT size.

Coarse time/fine Doppler acquisition is repeated for 10 blocks, according to at least one embodiment. The FFT-IFFT peak with the least overall rank is considered for determining the coarse time/Doppler. To account for varying Doppler in satellites where station-keeping boxes are large, Doppler is obtained as a mean Doppler on a Doppler plateau (Doppler plateaus defined as neighborhood of Doppler peaks within 6 dB of highest peak).

Figure 12:
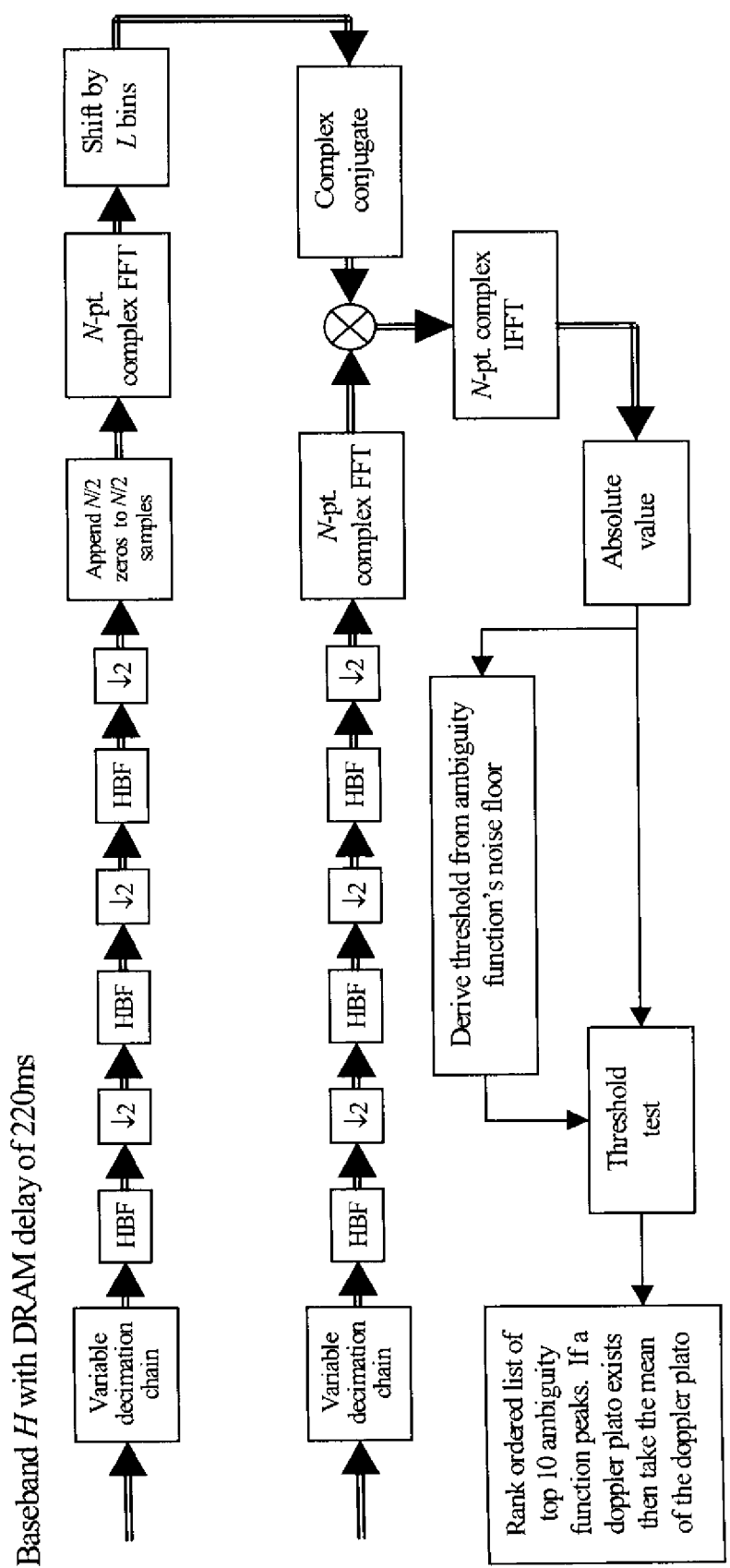
FIG. 12 shows a coarse timing and Doppler acquisition module in accordance with preferred embodiments of the invention.

FIG. 12 illustrates a coarse timing and Doppler acquisition module. Initiated on "power-on" and when, in "adaptive mode", the threshold test in "Distortion correction" fails for a period more than twice the LMS algorithm's convergence duration. This function assume an aperiodic, noise-like (white) symbol sequence with spectral shaping and SAW filter limiting bandwidth to 25 MHz (i.e., spectral occupancy is 25/35) or other bandwidth limit.

Figure 13:
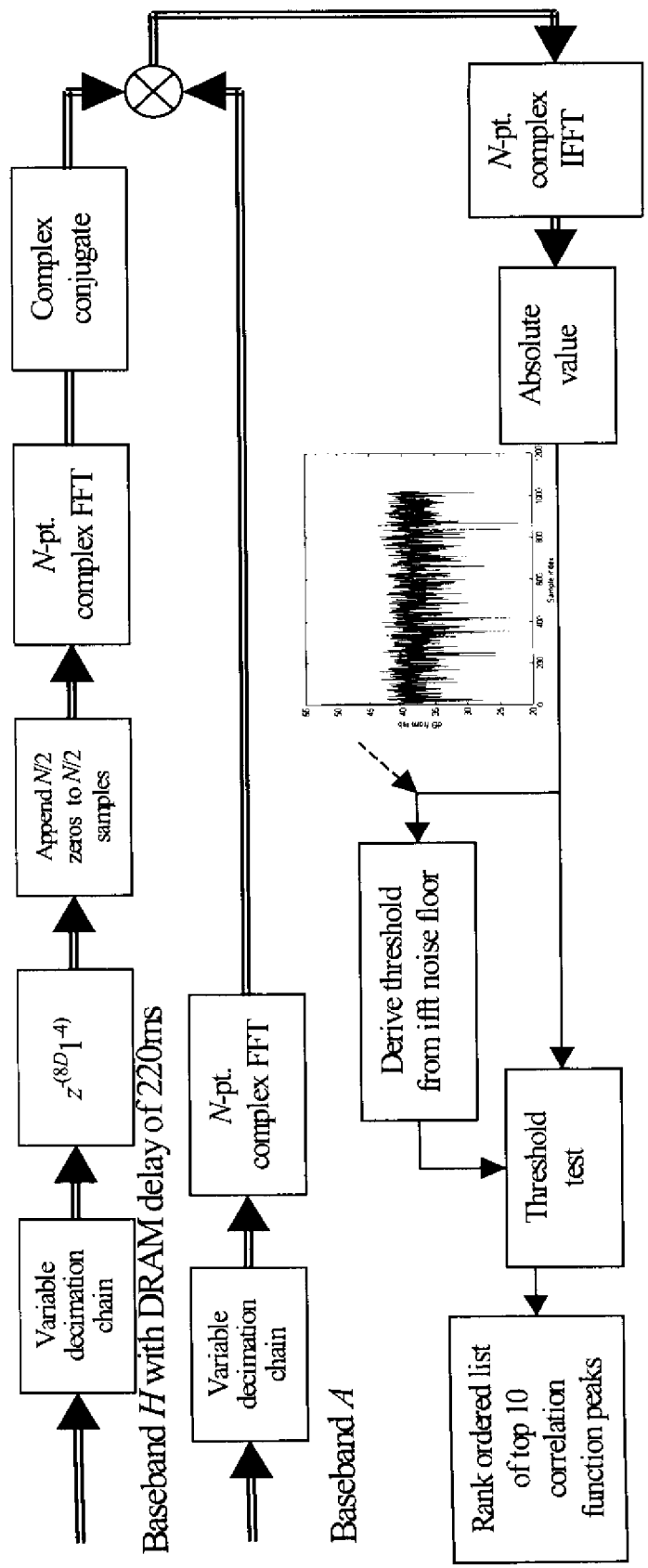
FIG. 13 shows a finer time acquisition module in accordance with preferred embodiments of the invention.
Figure 14:
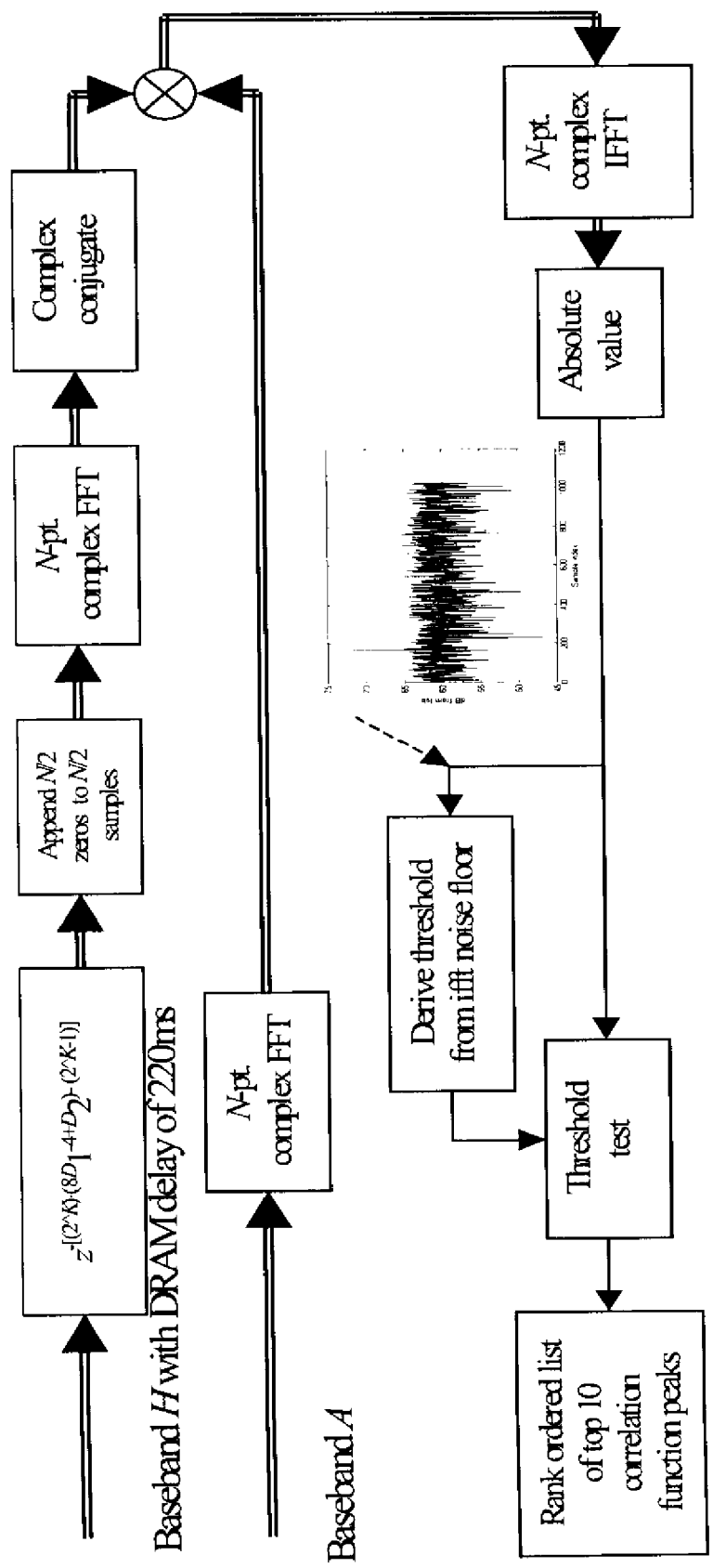
FIG. 14 shows a final acquisition module according to preferred embodiments of the invention.

FIGS. 13 and 14 provide two-step zooming-in for fine time resolution, applied to the range, with no Doppler. FIG. 13 provides for finer time acquisition and FIG. 14 provides for final acquisition. Each stage uses 512 samples corresponding to a search window, and a time resolution, to repeat the time determination over 10 blocks.

Figure 15A:
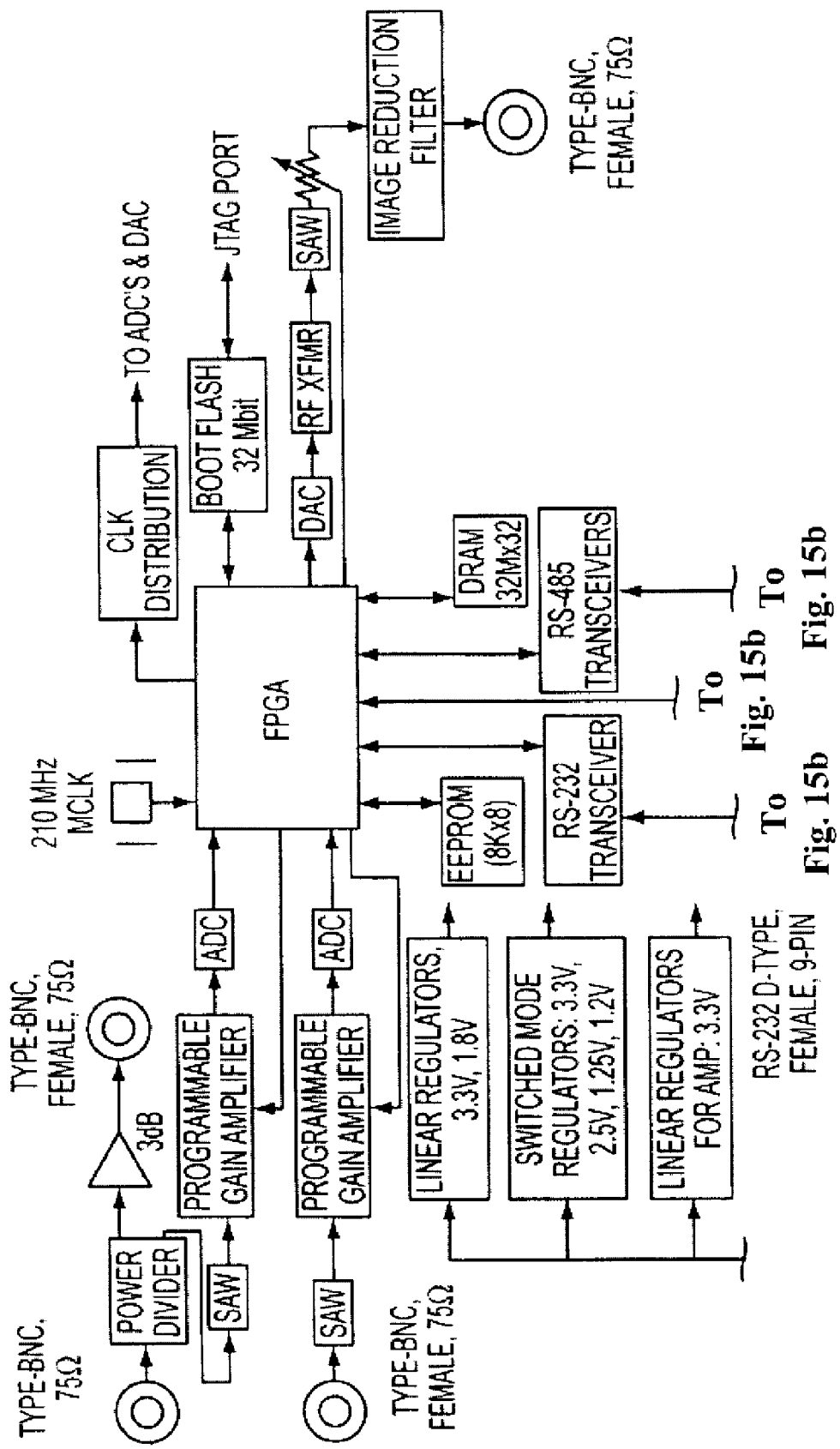

FIGS. 15a-15b provide an exemplary hardware configuration according to specific embodiments of the present invention. Therein, specific connections are detailed, such as connection to a control computer through RS-232 interface, modem interface, as well power converting and conditioning of the input power source. The input signal is filtered, buffered and converted into digital signals for input into the field-programmable gate array (FPGA) processor. The FPGA is connected to DRAM and EEPROM memories and a master clock signal, and after processing, as discussed above, the filtered echo-reduced signal is output.

An LMS echo reduction system with distortion compensation has been described wherein the amplitude and phase distortion characteristics are automatically acquired and tracked from the received signal (when echo dominates the received signal), the expressions for excess error with and without distortion compensation are obtained and distortion compensation is enabled when H/R exceeds a threshold.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A method for reducing echo noise in satellite communications in which a hub communicates with multiple remote stations via a satellite having a nonlinear satellite transponder, the method comprising the steps of:

transmitting a transmit signal from the hub to the multiple remote stations, where the transmit signal contains at least one carrier;

providing, at the hub, a replica of the transmit signal to a buffer that provides an integer sample delay;

distorting, at the hub, the replica of the transmit signal according to nonlinearities of the satellite transponder to provide a distorted replica of the transmit signal;

determining, at the hub, a scaled, fractional-sample time-delayed, frequency-shifted, and attenuated version of the distorted replica of the transmit signal to provide a compensated distorted replica of the transmit signal; and using, at the hub, the compensated distorted replica to represent the nonlinearities of the satellite transponder and reduce echo noise from a received aggregate signal received by the hub from the multiple remote stations via the satellite transponder;

wherein the distorting step further comprises applying a block conversion to the transmit signal to form the distorted replica occupying a predetermined frequency range and the determining step further comprises tracking the integer sample closest to a weight vector centroid of an adaptive filter to provide fractional-sample delay of the distorted replica.

2. The method of claim 1, wherein the step of applying the block conversion comprises reformulating the replica such that it occupies a 70 MHz frequency.

3. The method of claim 1, wherein the step of using the compensated distorted replica further comprises decimating the received aggregate signal through a series of filters that are dependent on the bandwidth of the received aggregate signal.

4. The method of claim 1, further comprising:
determining whether the transmit signal is present in the aggregate signal; and
performing the determining a scaled, delayed and distorted replica step when it is determined that the transmit signal is present.

5. The method of claim 1, wherein the distorting step further comprises matching echo noise distortion in the aggregate signal by determining normalized gain and phase error in the aggregate signal to compute the distortion.

6. The method of claim 1, wherein the determining step further comprises performing Doppler tracking by determining a conjugate of the aggregate signal to determine a Doppler shift and applying the Doppler shift to compute the replica.

7. The method of claim 6, wherein the determining a delay in the aggregate signal step further comprises performing a two step delay evaluation by determining a coarse timing delay and then a finer timing delay to provide the delay.

8. The method of claim 6, wherein the transmitting a transmit signal step comprises transmitting a transmit signal having a bandwidth between 0.1 MHz to 66 MHz.

9. A system for reducing echo noise in satellite communications in which a hub communicates with multiple remote stations via a satellite having a nonlinear satellite transponder, the system comprising:
transmitting a transmit signal from the hub to the multiple remote stations, where the transmit signal contains at least one carrier;
a buffer at the hub for storing a replica of the transmit signal sent from the hub to the multiple receiving stations, the buffer having an integer sample delay;
distorting means at the hub for distorting the replica of the transmit signal according to nonlinearities of the satellite transponder to provide a distorted replica of the transmit signal;
receiving means for receiving an aggregate signal from the multiple remote stations, where the aggregate signal includes a distorted version of the transmit signal previously sent from the hub to the multiple receiving stations;
determining means at the hub for determining a scaled, fractional-sample time-delayed, frequency-shifted, and attenuated version of the distorted replica of the transmit signal to provide a compensated distorted replica of the transmit signal; and echo noise reduction means for using the compensated distorted replica to represent the nonlinearities of the satellite transponder and reduce echo noise from a received aggregate signal received by the hub from the multiple remote stations via the satellite transponder;

wherein the distorting means further comprises means for applying a block conversion to the transmit signal to form the distorted replica occupying a predetermined frequency range and the determining means further tracks the integer sample closest to a weight vector centroid of an adaptive filter to provide factional-sample delay of the distorted replica.

10. The system of claim 9, wherein the means for applying the block conversion is configured to reformulate the replica such that it occupies a 70 MHz frequency.

11. The system of claim 9, wherein the echo noise reduction means further comprises decimating means for decimating the received aggregate signal through a series of filters that are dependent on the bandwidth of the received aggregate signal.

12. The system of claim 9, wherein the distorting means further comprises matching means for matching distortion in the aggregate signal by determining normalized gain and phase error in the aggregate signal to compute the distortion of the echo noise signal.

13. The system of claim 9, wherein the determining means further comprises Doppler tracking means for performing Doppler tracking by determining a conjugate of the aggregate signal to determine a Doppler shift and applying the Doppler shift to compute the replica of the echo noise signal.

14. The system of claim 9, wherein the determining means further comprises second means for determining a delay in the aggregate signal by computing a least mean square fractional sample of the aggregate signal and tracking changes therein to determine the delay.

15. An article of manufacture, comprising a computer-readable medium having stored thereon instructions for echo noise in satellite communications in which a hub communicates with multiple remote stations via a satellite having a nonlinear satellite transponder, said instructions which, when performed by a processor, cause the processor to execute the steps comprising the steps of:
transmitting a transmit signal from the hub to the multiple remote stations, where the transmit signal contains at least one carrier;
storing in a buffer at the hub, a replica of the transmit signal sent from the hub to the multiple receiving stations, the buffer having an integer sample delay;
distorting, at the hub, the replica of the transmit signal according to nonlinearities of the satellite transponder to provide a distorted replica of the transmit signal;
receiving an aggregate signal from multiple remote stations, where the aggregate signal includes a distorted version of the transmit signal previously sent from the hub to the multiple receiving stations;
determining, at the hub, a scaled, fractional-sample time-delayed, frequency-shifted, and attenuated version of the distorted replica of the transmit signal to provide a compensated distorted replica of the transmit signal; and
using, at the hub, the compensated distorted replica to represent the nonlinearities of the satellite transponder and reduce echo noise from a received aggregate signal received by the hub from the multiple remote stations via the satellite transponder;
wherein the distorting step further comprises applying a block conversion to the transmit signal to form the distorted replica occupying a predetermined frequency range and the determining step further comprises tracking the integer sample closest to a weight vector centroid of an adaptive filter to provide a fractional-sample delay of the distorted replica.

16. The article of manufacture of claim 15, wherein the step of applying the block conversion comprises reformulating the replica such that it occupies a 70 MHz frequency.

17. The article of manufacture of claim 15, wherein the step of using the compensated distorted replica further comprises decimating the received aggregate signal through a series of filters that are dependent on the bandwidth of the received aggregate signal.

18. The article of manufacture of claim 15, further comprising instructions which, when performed by a processor, cause the processor to execute the steps of:

determining whether the transmit signal is present in the aggregate signal; and performing the determining a scaled, delayed and distorted replica step when it is determined that the transmit signal is present.

19. The article of manufacture of claim 15, wherein the distorting step further comprises matching echo noise distortion in the aggregate signal by determining normalized gain and phase error in the aggregate signal to compute the distortion of the echo noise signal.

20. The article of manufacture of claim 15, wherein the determining step further comprises performing Doppler tracking by determining a conjugate of the aggregate signal to determine a Doppler shift and applying the Doppler shift to compute the replica of the echo noise signal.

* * * * *